United States Patent [19]

Hamilton et al.

[11] Patent Number: 5,060,974

[45] Date of Patent: Oct. 29, 1991

[54] GAS INFLATOR APPARATUS

[75] Inventors: Brian K. Hamilton, Littleton; Ronald J. Butt, Aurora, both of Colo.

[73] Assignee: OEA, Inc., Aurora, Colo.

[21] Appl. No.: 516,332

[22] Filed: Apr. 30, 1990

[51] Int. Cl.$^5$ .............................................. B60R 21/26
[52] U.S. Cl. .................................. 280/736; 280/737; 280/741
[58] Field of Search ............... 280/727, 728, 731, 732, 280/734, 735, 736, 737, 741, 742

[56] References Cited

U.S. PATENT DOCUMENTS

| | | | |
|---|---|---|---|
| 3,567,245 | 3/1971 | Ekstrom | 280/737 |
| 3,731,843 | 5/1973 | Anderson, Jr. | 222/3 |
| 3,895,821 | 7/1975 | Schotthoefer et al. | 280/737 |
| 3,948,540 | 4/1976 | Meacham | 280/150 |
| 3,966,228 | 6/1976 | Neuman | 280/737 |
| 4,018,457 | 4/1977 | Marlow | 280/735 |
| 4,049,935 | 9/1977 | Gruber | 200/83 P |
| 4,050,483 | 9/1977 | Bishop | 141/4 |
| 4,380,346 | 4/1983 | Davis et al. | 280/736 |
| 4,899,663 | 2/1990 | Thorn | 280/741 |

FOREIGN PATENT DOCUMENTS

| | | | |
|---|---|---|---|
| 2259798 | 6/1973 | Fed. Rep. of Germany | 280/741 |
| 53-11433 | 2/1978 | Japan . | |

Primary Examiner—Kenneth R. Rice
Assistant Examiner—Tamara L. Finlay
Attorney, Agent, or Firm—Sheridan, Ross & McIntosh

[57] ABSTRACT

A gas inflator apparatus for deploying inflatable devices, particularly automobile air bags, which provides an initial flow rate of gas onto the air bag, followed by a delayed maximum flow rate to fully depoly the air bag, the apparatus particularly having the capability to program the delay by monitoring cartain environmental conditions, namely pressure, and additionally providing temperature compensation for variations in ambient conditions, all of which optimize performance of the gas inflator apparatus over a wider range of operating conditions. A single electrical signal is sent to the gas inflator apparatus upon the sensing of an impact. The signal actuates an electro-explosive device which allows stored gas in the gas inflator apparatus to begin flowing into the air bag. Mechanical elements monitor the differential pressure between a pressure related to the pressure in the housing which stores the gas and a reference pressure. Upon achievement of a programmed differential pressure, the mechanical elements ignite a gas generator propellant, the combustion of which augments the flow rate into the air bag to ensure full inflation thereof.

31 Claims, 1 Drawing Sheet

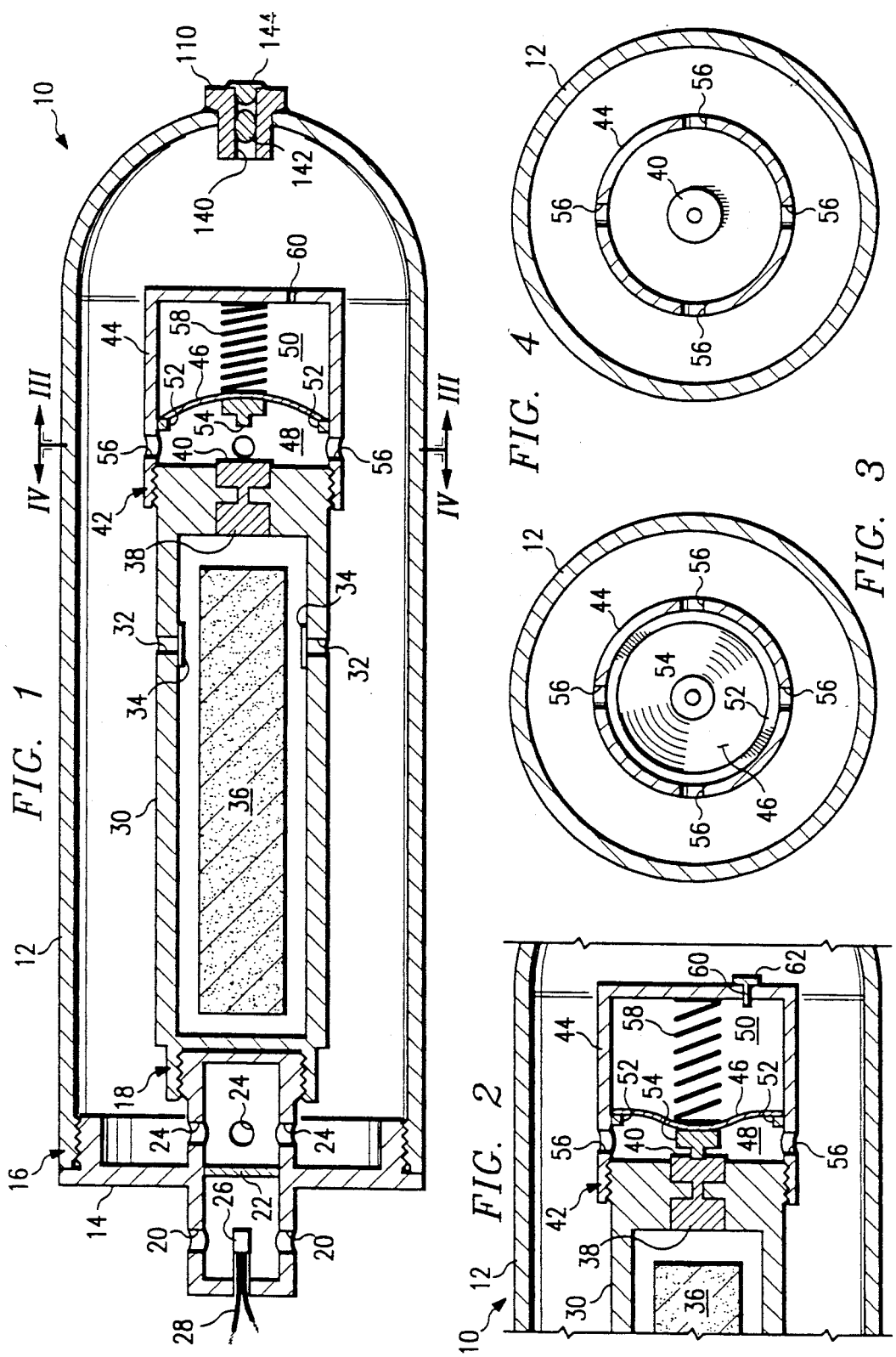

GAS INFLATOR APPARATUS

FIELD OF THE INVENTION

The present invention relates to gas inflator devices and, particularly, to such devices that include predetermined delays for controlling the gas flow rate.

BACKGROUND OF THE INVENTION

There have been many attempts in the past to improve the safety accorded to occupants of automobiles when involved in an accident. A portion of these attempts have dealt with the provision of various safety devices in the passenger compartment, most commonly by implementing passenger restraint systems such as safety belts and/or harnesses. However, during the 1970s some automobile manufacturers began supplementing these typical passenger restraining systems with air bags located throughout the passenger compartment to enhance the safety features of the automobile.

Many developments were made regarding the use of air bags during the 1970s, partially as a result of an increased awareness of the need for increased passenger safety as well as in anticipation of possible government regulations requiring that air bags be employed in all automobiles. Although a large amount of development was directed towards automobile air bags during this time period, due to various factors, these activities subsided and have only again begun to increase.

The general concept of an automobile air bag is to provide an inflatable structure that is responsive to an impact which will inhibit the forward motion of a passenger to reduce the likelihood of suffering severe injury when involved in an accident. Although the air bag is quite simple in concept, there have been numerous developments regarding the manner in which the air bag is inflated, including regulation of the flow rate of the materials injected therein.

In U.S. Pat. No. 4,018,457 to Marlow, issued Apr. 19, 1977, an air bag safety apparatus is disclosed in which there are basically two flow rates for the material being injected into the air bag—one for low impact collisions and another for high impact collisions. The Marlow apparatus includes an outer containment which stores a gas under pressure for inflating an air bag. Enclosed within this outer containment is a propellant containment which stores a propellant charge. In a low impact collision, one ignitor activates the propellant charge, causing an increase in pressure within the propellant containment. This increase in pressure eventually ruptures a disk which isolates the propellant containment from both the outer containment and a ramming member. Upon rupture of this disk, exhaust gases from combustion of the propellant charge mix with the gas stored in the outer containment. In addition, the rupture also directs a ramming member towards a disk which ultimately isolates the outer containment from the air bag. The ramming rod breaks this disk and allows the mixed gasses to flow into the air bag. The operation of the apparatus for a high impact collision merely adds the additional step of firing a second ignitor which, summarily, causes the propellant charge to burn at a faster rate, thereby increasing the flow rate into the air bag. Regardless of whether one or two ignitors are activated in the Marlow apparatus to ignite the propellant, the activation is ultimately produced by an electrical signal. Furthermore, even though the Marlow patent discloses two flow rates into an air bag for low and high impact collisions, there is no disclosed means of increasing the flow rate into an air bag after an initial volume of material has been injected therein.

U.S. Pat. No. 4,050,483 to Bishop, issued Sept, 27, 1977, discloses an inflation apparatus which incorporates a surge delay. In this apparatus, there is a cylinder containing a volume of gas under pressure. At the discharge end of this cylinder, a rupture disk separates the cylinder from the manifold connecting the cylinder to the air bag. The rupture disk is coupled with a device capable of generating a force sufficient to break the rupture disk. When a collision is sensed, a signal is sent to the device to rupture the disk and thereby allow gas to begin to flow from the cylinder, through a discharge manifold, and into the air bag. The rate of deployment of the air bag at this juncture is reduced since the flow of gasses prior to the ignition of the propellant charge does not generate sufficient pressure to rupture a disk located in the manifold's main flow channel. Consequently, the initial flow of gasses is through secondary flow channels in the manifold. Upon breakage of the rupture disk allowing the initial flow of gas into the air bag, there is a predetermined time delay after which a second signal is sent to the end of the cylinder opposite the discharge manifold to activate a propellant charge contained in an isolated chamber. Upon ignition of this propellant charge, a disk isolating the propellant charge from the cylinder is ruptured and the propellant gasses flow into the cylinder, mixing with the gasses contained therein. Coinciding with this mixture, gas continues to flow out through the manifold. As the propellant charge burns, pressure within the cylinder will increase sufficiently to break the disk in the manifold's main flow channel. Consequently, the flow rate of the gas into the air bag reaches a maximum level. Although the Bishop patent discloses a variable deployment rate of an air bag, the variable deployment rate is the result of two electrical signals.

U.S. Pat. No. 3,966,228 to Neuman, issued June 29, 1976, discloses an air bag restraint system in which the rate of deployment of the air bag varies over time. In one embodiment of this invention, there is a first cylinder containing a certain volume of gas under pressure. A manifold connects the first cylinder to the air bag, but a disk having charges contained therein prohibits flow of gasses therebetween. At an end opposite of this disk is a second cylinder in communication with the first cylinder by means of an orifice. The second cylinder thus also initially has gas under pressure equal to that within the first cylinder. When sensors detect a collision, an electrical signal is sent to the charges within the disk. The explosion causes the disk to break and gas begins to flow into the air bag, including gas from the second cylinder which flows into the first cylinder, through the orifice, and into the air bag. Since the cross-sectional area of the orifice is smaller than that of the manifold connecting the first cylinder and the air bag, the pressure in the second cylinder will not decrease as rapidly as the pressure in the first cylinder. When a certain pressure differential between the first and second cylinders is achieved, the piece containing the orifice will break. Upon the breaking of this portion, the flow rate of the gas from the second cylinder into the first cylinder, and eventually into the air bag, will be increased to a maximum level. Although the Neuman patent discloses a variable deployment rate from a single electrical signal together with the use of a pressure differential, there is no disclosure or suggestion of using the pressure differential for the ignition of any type of propellant. Therefore, in order to fully inflate the air bag, a larger volume of gas is needed since no heat is being applied to expand the gas and thereby increase the pressure and flow rate. Relatedly, it is likely that larger cylinders would be required to store the gas.

U.S. Pat. No. 3,895,821 to Schotthoefer et al., issued July 22, 1975, discloses an inflation apparatus for an air bag safety device which uses only a single charge initiated by an electrical signal. In this apparatus, there is an outer cylinder containing a volume of gas under pressure. At the end of the cylinder nearest the inflatable apparatus, namely the air bag, there is a second inner cylinder with a propellant charge. There is a disk isolating the propellant in the inner cylinder from the outer cylinder. The disk also covers discharge ports connecting the outer cylinder to the manifold which is connected to the air bag. Upon sensing a collision, the propellant charge is ignited which causes the rupturing of the disk. Thereafter, the propellant gasses mix with the gas in the outer cylinder and gas begins to flow into the air bag through the ports connecting the outer cylinder to the manifold. Although the Schotthoefer et al. patent discloses using a single electrical signal for deploying an air bag with ignition of a propellant to expand the gas, there is no disclosed delay between an initial flow rate into the air bag and a subsequent larger flow rate into the air bag.

U.S. Pat. No. 4,049,935 to Gruber, issued Sept. 20, 1977, discloses a pressure switch which utilizes a diaphragm. This particular apparatus does not directly relate to the ignition of a propellant charge or other equivalent which will result in initiation of flow into an air bag. The apparatus is merely directed towards a pressure sensing device wherein by use of a diaphragm, a means is provided to generate a warning signal that the air bag safety device is inoperable in its present condition. In particular, there is a diaphragm which has a constant pressure on one side thereof produced by a volume of gas contained in a isolated reference chamber. The opposite side of the diaphragm is subjected to the pressure of the gas in the cylinder which ultimately flows into the air bag. When the inflating apparatus is operable, the pressure in the cylinder is greater than the pressure in the reference chamber. In such a case, the diaphragm is deflected in a position wherein the apparatus is electrically connected so that if a collision occurs, the inflator will operate to inflate or deploy the air bag by operation of a non-disclosed inflating means. However, if the pressure in the cylinder is reduced below a certain level, the diaphragm will deflect as a result of the pressure in the reference chamber exceeding the pressure in the cylinder by a certain amount. This will result in a separate electrical connection which will generate a warning indicating that the inflating apparatus is inoperable in its present condition.

Although the above-discussed references have each contributed to the useful deployment of air bags, a number of deficiencies still exist, which, if corrected, would provide an improved air bag inflator. An object of the present invention is therefore to provide a plurality of features which are directed toward overcoming these deficiencies, particularly by providing a single, compact apparatus which utilizes a single electrical signal to initiate deployment of an air bag, while still utilizing a delayed augmentation of the initial flow rate to fully inflate the air bag. A further object of the present invention is to provide a propellant-augmented inflator which is more simple in construction, has fewer or less expensive component parts, and has all active inflator components on one end of the inflator. Another object of the present invention is to provide an inflator which is more adaptable to programming the gas delivery rate to certain desired criteria and which is temperature compensated to minimize variation in the performance of the inflator due to changes in ambient temperature.

SUMMARY OF THE INVENTION

The present invention provides an apparatus for inflating various devices, but is particularly suitable for use with automobile air bags. The apparatus provides an initial flow rate into the air bag from a source of compressed gas stored in a first housing under a first housing pressure at ambient conditions. This initial flow rate decays over time as the first housing pressure decreases. After lapse of a programmed time delay, a combustible material stored in a second housing which is connected to the first housing is ignited, thereby augmenting the flow rate into the air bag. This programmed time delay between the initial flow rate and the subsequent augmentation is achieved by using a pressure-sensing device which monitors the differential pressure between a pressure related to the first housing pressure and a reference pressure. Consequently, ignition of the combustible material is in reaction to achievement of preselected conditions and not directly related to a preselected time delay. Furthermore, ignition of the combustible material does not depend upon the receipt of a second electrical signal but is instead activated by mechanical elements.

The present invention will now be described in more detail with regard to the preferred embodiment. An outer housing containing compressed gas under an outer housing pressure is connected to an air bag but is temporarily isolated therefrom by a disk. In close proximity to this disk is a detonation device, such as an electric squib, for rupturing the disk. A gas generator housing which stores a combustible material, such as a gas generator propellant, is contained within the outer housing and is connected thereto by threadable engagement or other suitable techniques. The gas generator propellant may be isolated from the compressed gas in the outer housing by isolating disks or shims. The gas generator housing also contains elements for igniting the combustible material such as a percussion primer(s) and pyrotechnic booster or other suitable ignition devices.

A differential pressure housing is attached to the gas generator housing in the region of the ignition elements by threadable engagement or other suitable techniques. The differential pressure housing includes a cup-shaped diaphragm which separates the housing into two compartments. The first compartment is fluidly connected to the outer housing and contains compressed gas under a first pressure which is substantially equal to the outer housing pressure in the static state (before initiation of inflation). The side of the diaphragm facing the first compartment has a firing pin or impacting mass attached thereto for engaging with the ignition elements of the gas generator housing. The second compartment is also fluidly connected to the outer housing by an orifice or hole and thus contains compressed gas under a reference pressure which is also substantially equal to the outer housing pressure in the static state. However, the cross-sectional area of the orifice relative to the volume of the second compartment is smaller than the total cross-sectional area of the connections between the first compartment and the outer housing, relative to the volume of the first compartment, and consequently, the reference pressure will exceed the first pressure in the dynamic state (during inflation) as described below. Modification of the orifice size is thus one method to define or control the magnitude of the delay before the ignition elements are activated.

In operation of the preferred embodiment of the present invention, an electrical signal is sent to the electric squib from an impact/collision sensor, actuating the electric squib and rupturing the disk that had isolated the compressed gas in the outer housing from the air bag. Consequently, compressed gas expands from the outer housing and begins to flow into the air bag. This flow of compressed gas into the air bag causes a corresponding drop in the outer housing pressure.

In its pre-impact position, the cup-shaped diaphragm in the differential pressure housing is deflected in the direction of the second compartment. As the outer housing pressure continues to drop, there is a corresponding drop in the first pressure within the first compartment of the differential pressure housing. The reference pressure within the second compartment of the differential pressure housing also decreases, but at a slower rate than the pressure drop of the first pressure. When a certain pre-established differential pressure develops between the pressures of the first and second compartments (i.e., when the reference pressure exceeds the first pressure by a pre-set amount), the cup-shaped diaphragm inverts, causing the firing pin or mass attached thereto to strike the percussion primer(s) on the gas generator housing. The impact on the percussion primer(s) ignites the pyrotechnic booster which in turn ignites the gas generator propellant. As the gas generator propellant burns, the pressure within the gas generator housing increases to a level at which the gas generator isolation disks are ruptured or removed, thereby allowing the exhaust gases to mix with the compressed gas in the outer housing to augment the flow rate into the air bag.

The present invention requires only a single electrical signal to deploy an air bag. The electrical signal is directed to an electric squib or other similar electro-explosive device to initiate the inflation of the air bag. After a preprogrammed delay has elapsed, mechanical elements activate a gas generator to augment the flow into the air bag. Based upon the configuration, the present invention provides a number of advantages not found in any one known inflating device.

The present invention varies the rate of inflation over time, i.e., inflating the air bag at a maximum rate only after the air bag has been partially inflated to a certain degree. This feature is desirable in a number of respects. For instance, delaying the maximum rate of inflation allows the air bag to, in a sense, ease into contact with the occupant which reduces the likelihood that the impact of the air bag on the occupant will in and of itself cause injury. Furthermore, the initial inflation of the air bag with a gas stored under ambient conditions, which is comparatively cooler than that gas received after augmentation by ignition of the gas generator, assists in reducing thermal deterioration of the air bag.

Another advantage of the present invention relates to the ability to regulate the variable inflation rate. For instance, the present invention can be programmed based upon desired criteria over the specified environmental conditions, one of such conditions being pressure. Moreover, the present invention is temperature sensitive to minimize variation in performance of the inflator due to changes in ambient temperature. Consequently, the present invention provides an inflator which does not rely on a limiting delay mechanism such as a timer, but instead upon elements which monitor certain conditions and react accordingly to optimize performance of the inflator over a wider range of operating conditions.

There are also a number of advantages associated with using electrical elements to initiate the inflation of the air bag and mechanical elements to augment the inflation rate after the delay. Initially, reducing the number of required electrical components directly correlates to a reduction in the overall cost of the apparatus. Moreover, the particular mechanical elements used to activate the gas generator also monitor certain conditions, namely a differential pressure, to determine when the ignition should occur. Consequently, augmentation of the inflation rate is reactive to the changing conditions during the initial inflation of the air bag and is not confined to a definitive time delay, in contrast to systems which initiate augmentation by the sending of a second electrical signal to a gas generator at a predetermined time after initial deployment.

A further advantage of the present invention over current practice relates to what occurs if the apparatus is subjected to a fire. In such a case, the container is heated, thereby increasing the pressure of the stored gas until the disk ruptures. Subsequently, the propellant is ignited and the apparatus functions in a non-catastrophic manner, i.e., it functions as if the squib were activated normally and without container rupture.

The preferred embodiment of the present invention offers a further advantage. Since all major elements of the apparatus are contained within a single element, namely the outer housing, the preferred embodiment is somewhat more compact than many of the known inflating apparatuses and is in fact more simple in construction. This is an important feature when such devices are used with automobile air bags since space in some cars is often at a premium.

BRIEF DESCRIPTION OF THE DRAWINGS

FIG. 1 is a cross-sectional view showing the internal structure of the preferred embodiment of the present invention;

FIG. 2 is a partial cut-away view of the pressure-sensing and ignition means of the preferred embodiment of FIG. 1 after ignition has occurred;

FIG. 3 is a cross-sectional view of the preferred embodiment of FIG. 1 taken along line III—III; and FIG. 4 is a cross-sectional view of the preferred embodiment of FIG. 1 taken along line IV—IV.

DETAILED DESCRIPTION OF THE INVENTION

In accordance with the present invention, a gas inflator apparatus 10 is provided for inflating various devices, although it is particularly well suited for use with automobile air bags. The present invention possesses numerous features which enhance the operating characteristics of air bags, including compactness, cost effectiveness, temperature sensitivity, variable programmable flow rates in response to certain changing conditions, and inherently safe bonfire activation. The particular feature of the present invention which allow for these and other advantages will be discussed in more detail below.

With reference to the drawings, the present invention generally includes stored gas housing 12 which contains compressed gas under pressure. Stored gas housing 12 is connected to a conduit (not shown) which ultimately connects to an air bag (not shown), but is temporarily isolated therefrom by main isolation disk 22. When involved in a collision warranting deployment of the air bag, main isolation disk 22 is removed or ruptured and the compressed gas within stored gas housing 12 begins to flow into the air bag through the conduit, thereby reducing the pressure within stored gas housing 12.

Gas generator housing 30 is contained within stored gas housing 12 and contains gas generator propellant 36. When the pressure within stored gas housing 12 decays to a predetermined level, gas generator propellant 36 is ignited. The hot exhaust gases from combustion of gas generator propellant 36 ultimately mixes with the compressed gas within stored gas housing 12, thereby augmenting the flow rate into the air bag for maximum deployment.

The preferred embodiment of the present invention, illustrated in FIGS. 1-4, will now be described in more detail with regard to the elements and manner of operation. Gas inflator apparatus 10 has three main structural elements, namely stored gas housing 12, gas generator housing 30, and differential pressure housing 44. As most clearly illustrated in FIG. 1, essentially all elements of gas inflator apparatus 10 are contained within stored gas housing 12.

Stored gas housing 12 contains compressed gas and is connected to manifold connector 14 by first threaded connection 16. Manifold connector 14 is connected to a manifold or other similar conduit (not shown) which is ultimately connected to an air bag (not shown). Although connected to the air bag via manifold connector 14, stored gas housing 12 is temporarily isolated therefrom (i.e., the compressed gas within stored gas housing 12 is substantially prevented from entering the air bag until a proper degree of impact is sensed) by main isolation disk 22 positioned in manifold connector 14. Manifold outlets 20 are positioned on manifold connector 14 in the region between the air bag and main isolation disk 22 and provide the actual means for communication between stored gas housing 12 and the air bag. Housing outlets 24 are positioned on the opposite side of main isolation disk 22 on manifold connector 14 which allows compressed gas in stored gas housing 12 to exert a force on main isolation disk 22 prior to rupture or removal thereof.

In order for gas inflator apparatus 10 to be operative, main isolation disk 22 must of course somehow be removable or rupturable to initiate inflation of the air bag. In that regard, electric squib 26 is positioned adjacent to or in close proximity with main isolation disk 22, preferably on the manifold side. When collision or impact sensors (not shown) detect an impact which warrants deployment of the air bag, these sensors send a signal to electric squib 26 through squib leads 28. Upon receipt of the signal, electric squib 26 is activated which ruptures main isolation disk 22 and allows the compressed gas within stored gas housing 12 to begin flowing into the air bag through housing outlets 24, manifold connector 14, manifold outlets 20, and the manifold (not shown).

Gas generator housing 30 is contained within stored gas housing 12 and is attached to the portion of manifold connector 14 which extends within stored gas housing 12 at second threaded connection 18. Gas generator housing 30 contains gas generator propellant 36, as well as pyrotechnic booster 38 and percussion primer(s) 40 which are used to ignite gas generator propellant 36. Gas generator outlets 32 provide fluid communication between gas generator housing 30 and stored gas housing 12. However, outlet disks 34 temporarily provide isolation therebetween. Outlet disks 34 are either removed or ruptured after ignition of gas generator propellant 36 to allow the exhaust gases from burning of gas generator propellant 36 to mix with the compressed gas in stored gas housing 12 to augment the flow rate into the air bag.

Differential pressure housing 44 is connected to gas generator housing 30 by third threaded connection 42. Diaphragm 46 separates differential pressure housing 44 into first compartment 48 and second compartment 50, and substantially prohibits any communication of gases therebetween. Rim 52 is attached to the inner wall of differential pressure housing 44 and provides a seat for diaphragm 46. Diaphragm 46 is cup-shaped, being deflected towards second compartment 50 when gas inflator apparatus 10 is in the static state. Spring 58 is attached to the interior of differential pressure housing 44 in second compartment 50 and to diaphragm 46 to provide a biasing force. On the side facing first compartment 48, diaphragm 46 has firing pin 54 attached thereto for engagement with percussion primer(s) 40 when gas generator propellant 36 is to be ignited.

Pressure outlets 56 provide the fluid communication between the interior of stored gas housing 12 and the interior of first compartment 48 so that the pressure in stored gas housing 12 and the pressure in first compartment 48 (first pressure) in the static state are substantially equal. Second compartment 50 has orifice 60 which fluidly connects second compartment 50 with the interior of stored gas housing 12 so that the pressure in stored gas housing 12 and the pressure second compartment 50 (reference pressure) in the static state are also substantially equal. However, the cross-sectional area of orifice 60 is smaller than the total cross-sectional areas of pressure outlets 56. Therefore, as will be discussed in more detail below, in the dynamic state when compressed gas is exiting stored gas housing 12, the rate of the pressure drop in first compartment 48 will exceed that of second compartment 50.

When compressed gas from stored gas housing 12 begins to flow into the air bag and the pressure within stored gas housing 12 begins to decrease, the first pressure within first compartment 48 correspondingly begins to decrease. In addition, the reference pressure within second compartment 50 also begins to decrease but at a slower rate than the drop of the first pressure in first compartment 48. When the reference pressure within second compartment 50 exceeds the first pressure within first compartment 48 by a predetermined amount, and with the assistance of the biasing force exerted by spring 58, diaphragm 46 will invert, causing firing pin 54 to strike percussion primer(s) 40 and ignite gas generator propellant 36 via detonation of pyrotechnic booster 38. Ignition of gas generator propellant 36 then augments the flow rate into the air bag.

Having described the construction of the preferred embodiment of the present invention and the general sequence of operation, some of the particular elements will now be discussed in more detail.

Stored gas housing 12 contains most of the major components of gas inflator 10 as well as compressed gas. When the apparatus is used with a right front passenger air bag, the inner volume of stored gas housing 12 can range from about 20 cubic inches to about 70 cubic inches, the preferred volume being about 35 cubic inches. When compressed gas has been injected into stored gas housing 12, the pressure within stored gas housing 12 will range from about 1000 pounds per square inch (psi) to about 6000 psi, the preferred pressure being about 3000 psi, and the practical range being about 2000 psi to about 4000 psi.

Gas generator housing 30 contains gas generator propellant 36 which is used to augment the flow rate into the air bag. Propellants such as plasticized PVC/potassium perchlorate are suitable for such use. Since the initial ignition of gas generator propellant 36 generates a substantial pressure, gas generator housing 30 must be able to withstand such forces. Consequently, materials such as steel can be used in construction of gas generator housing 30.

Differential pressure housing 44 essentially functions as a part of the pressure sensing means for ignition of gas generator propellant 36 and is contained within stored gas housing 12. As a part of this function, differential pressure housing 44 is separated into two compartments by diaphragm 46. In the static state, first compartment 48 and second compartment 50 are at the same pressure as that in stored gas housing 12. Therefore, differential pressure housing 44 must be able to withstand this pressure.

Diaphragm 46 which separates differential pressure housing 44 into two compartments plays an integral part in the sensing of the differential pressure to initiate augmentation of the flow rate into the air bag. Diaphragm 46 can be formed from a sheet of austenitic stainless steel and have a thickness ranging from about 0.005 inches to about 0.050 inches, depending upon the particular material used in construction. Preferably, however, diaphragm 46 is bimetallic having two metals with different thermal expansion coefficients. Such disks are manufactured by Therm-O-Disc (subsidiary of Emerson Electric).

When diaphragm 46 is bimetallic, initiation of augmentation can be controlled such that at a lower temperature, a lower differential pressure (and therefore a shorter time) is required to initiate augmentation, whereas a higher pressure differential pressure (and a longer time) is required at high temperatures before augmentation occurs. The variation in degrees of differential pressure based upon essentially ambient temperatures is desirable since gas generator propellant 36 burns at different rates at different temperatures. A shorter delay is necessary at lower ambient temperatures to ensure proper deployment of the air bag due to the slower combustion rate of gas generator propellant 36 at these temperatures. Conversely, a longer delay is desirable at a higher ambient temperature since the combustion rate of gas generator propellant 36 is higher at elevated ambient temperatures.

Since gas inflator apparatus 10 operates basically on differential pressures, the various orifices in the elements also become an integral part in ensuring the proper inflation of the air bag. For instance, at the above described pressures for stored gas housing 12, housing outlets 24 and manifold outlets 20 must be sufficient size to allow initial inflation of the air bag without overly rapid flow from stored gas housing 12 into the air bag. In the case where the apparatus is used with the right front passenger air bag, the total area of housing outlets 24 should range from about 0.02 square inches to about 0.5 square inches and the total area of manifold outlets 20 should range from about 0.02 square inches to about 0.7 square inches.

Since initiation of augmentation relates to development of a pressure differential between second compartment 50 and first compartment 48, the size of pressure outlets 56 and orifice 60 are important. In the case where the apparatus is used with the right front passenger air bag, pressure outlets 56 should have an area ranging from about 0.02 square inches to about 0.25 square inches. Orifice 60, which also controls the time dependency of the differential pressure that activates diaphragm 46, should have a cross-sectional area of up to about 0.001 square inches.

The rate at which exhaust gases from combustion of gas generator propellant 36 leaves gas generator housing 30 is also important since it is directly related to the degree of augmentation of the flow rate into the air bag. Consequently, the total area of gas generator outlets 32 should range from about 0.005 square inches to about 0.15 square inches.

The remaining elements of the preferred embodiment of the present invention are "off the shelf" type items. For instance, electric squib 26 can be any type of detonator which generates a sufficient force to rupture isolation disk 22. Likewise, pyrotechnic booster 38, percussion primer(s) 40, and firing pin 54 are also commonly available items that can be obtained from a number of known sources. Finally, spring 58 should have a spring constant that will enable it to be compressed to a degree necessary to exert a force on diaphragm 46.

Having described the elements of the preferred embodiment of the present invention and the manner in which they are constructed, the manner of its operation will now be described in more detail. To initiate deployment of an air bag, impact or collision sensors (not shown) will send a signal to electric squib 26 through squib leads 28 to activate electric squib 26. Activation of electric squib 26 generates sufficient force to rupture main isolation disk 22. Rupture of isolation disk 22 thereby allows compressed gas from stored gas housing 12 to flow through housing outlets 24, manifold outlets 20, and a manifold or other conduit (not shown) into an air bag (not shown). The initial flow rate into the air bag is of course governed by the pressure initially within stored gas housing 12 and by the area of housing outlets 24, manifold outlets 20, and the manifold or conduit. The compressed gas is also at ambient temperature because no ignition of any combustion element has yet taken place. As the compressed gas within stored gas housing 12 flows into the air bag, the pressure within stored gas housing 12 decreases. Correspondingly, the first pressure within first compartment 48 and the reference pressure within second compartment 50 also decreases, although the rate of decrease in pressure is greater in first compartment 48 compared to second compartment 50. When the reference pressure within second compartment 50 exceeds the first pressure within first compartment 48 by a predetermined amount, together with the biasing force exerted by spring 58, diaphragm 46 will invert from its position as shown in FIG. 1 to the position shown in FIG. 2. The inversion of the diaphragm 46 is thus the direct result of the forces generated by the pressure differential and the bias of spring 58.

The inversion of diaphragm 46 into the position illustrated in FIG. 2 causes firing pin 54 to impact percussion primer(s) 40, which in turn ignites pyrotechnic booster 38. Ignition of pyrotechnic booster 38 then ignites gas generator propellant 36. As gas generator propellant 36 burns, sufficient pressure will build up within gas generator housing 30 to remove or rupture outlet disks 34. Once outlet disks 34 no longer isolate the interiors of gas generator housing 30 from stored gas housing 12, exhaust gases from combustion of gas generator propellant 36 will flow into stored gas housing 12 and mix with the compressed gas. Consequently, the flow rate into the air bag will be increased to a predetermined rate.

Although the construction and operation has been described in the above manner, those skilled in the art will appreciate that numerous modifications can be made without departing from the teachings of the present invention. For instance, all major elements need not be contained within stored gas housing 12. Particularly, stored gas housing 12, gas generator housing 30, and differential pressure housing 44 could be aligned in end-to-end fashion. However, such a configuration would detract from the space saving feature of the preferred embodiment. Notwithstanding, in applications where there are little or not space restrictions, such a configuration may be appropriate.

There are other structural modifications which are encompassed by the present invention. For instance, gas generator housing 30 and differential pressure housing 44 could of course be combined into a single housing. Moreover, differential pressure housing 44 could be positioned between gas generator housing 30 and manifold 14, with the exhaust gases from burning of gas generator propellant 36 exiting toward the closed end of the stored gas housing 12 through at least one orifice replacing gas generator outlets 32.

Another modifiable feature is spring 58 which exerts a force on diaphragm 46, and thus offers a tool for adjusting the delay of gas inflator apparatus 10. Spring 58 can be removed altogether or replaced by another spring 58 having a different spring constant. Additionally, diaphragm 46 could be replaced by a piston retained by a shear pin. This technique would have all the advantages of the present invention with the exception of temperature compensation.

The foregoing description of the invention has been presented for purposes of illustration and description. Further, the description is not intended to limit the invention to the form disclosed herein. Consequently, variations and modifications commensurate with the above teachings, in the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by their particular applications or uses of the invention. It is intended that the appended claims be construed to include alternative embodiments to the extent permitted by the prior art.

We claim:

1. An apparatus for inflating an inflatable container in which a delay is provided and wherein a gas propellant is activated without direct use of an electric signal, comprising:

first means for containing gas and having a wall;

electro-explosive device means for creating a path for gas from said first means to the inflatable container, wherein said electro-explosive device means is electrically activated;

propellant means positioned within said first means;

pressure sensing means operatively connected to said first means for monitoring a differential pressure between a first pressure related to the pressure of the gas in said first means and a reference pressure, wherein said reference pressure exceeds said first pressure during the dynamic state and wherein the gas creating said reference pressure does not provide a substantial portion of the gas used to inflate the inflatable container; and second means for controlling activation of said propellant means, wherein said second means responds to movement of at least a portion of said pressure sensing means away from said reference pressure to activate said propellant means after a delay without electrical activation thereof, thereby increasing the gas flow rate provided to the inflatable container.

2. An apparatus, as claimed in claim 1, wherein:
said electro-explosive device means is located adjacent to at least a portion of said wall of said first means and is adapted to be positioned either exteriorly or interiorly of said first means.

3. An apparatus, as claimed in claim 1, wherein:
said pressure sensing means includes diaphragm means adapted to be moved using said differential pressure.

4. An apparatus, as claimed in claim 3, wherein:
said second means for controlling includes third means movable using said diaphragm means for causing said propellant means to be activated.

5. An apparatus, as claimed in claim 3, wherein:
said pressure sensing means includes a spring operably connected to said diaphragm means.

6. An apparatus, as claimed in claim 1, wherein:
said pressure sensing means includes means for compensating for temperature, wherein said means for compensating varies movement of said diaphragm means over time dependent upon the ambient temperature in which said apparatus operates.

7. An apparatus, as claimed in claim 6, wherein:
said means for compensating includes bi-metallic means.

8. An apparatus, as claimed in claim 1, wherein:
said pressure sensing means includes body means having a hole adapted for communication with the gas contained in said first means.

9. An apparatus, as claimed in claim 1, wherein:
said reference pressure is provided by means of a gas contained on a side of diaphragm means.

10. An apparatus for inflating an inflatable container, comprising:

first enclosure means containing compressed gas under a first pressure;

first connecting means for connecting said first enclosure means to an inflatable container;

first barrier means for providing a barrier between said first enclosure means and said first connecting means;

means for breaking said first barrier means, wherein said compressed gas in said first enclosure means begins to flow from said first enclosure means through said connecting means into the inflatable container;

second enclosure means containing a combustible material;
second connecting means for connecting said first enclosure means to said second enclosure means;
second barrier means for providing a barrier between said second enclosure means and said first enclosure means;
pressure sensing means for monitoring a differential pressure between a second pressure and a reference pressure, wherein said second pressure is related to said first pressure; and
mechanical ignition means for igniting said combustible material to break said second barrier means and thereby permit exhaust gases from said combustible material to mix with said compressed gas to increase the flow rate thereof into the inflatable container, wherein said pressure sensing means activates said ignition means when said pressure sensing means detects a first differential pressure between said second pressure and said reference pressure, said reference pressure exceeding said second pressure in the dynamic state.

11. An apparatus, as claimed in claim 10, wherein:
said first barrier means includes a disk.

12. An apparatus, as claimed in claim 10, wherein:
said means for breaking includes an electric squib for receiving an electric signal.

13. An apparatus, as claimed in claim 10, wherein:
said second barrier means includes at least one disk positioned in a passageway providing communication between said second enclosure means and said first enclosure means.

14. An apparatus, as claimed in claim 10, wherein:
said second enclosure means includes a section having a diaphragm separating said section into two compartments, said first compartment being in communication with said first enclosure means and under said second pressure, said second pressure being substantially equal to said first pressure in the static state, and said second compartment containing compressed gas.

15. An apparatus, as claimed in claim 14, wherein:
a spring extends from a wall of said second enclosure to said diaphragm.

16. An apparatus, as claimed claim 14, wherein:
said second compartment contains compressed gas under said reference pressure.

17. An apparatus, as claimed in claim 14, wherein
said second compartment is in fluid communication with said first enclosure means and is at said first pressure.

18. An apparatus, as claimed in claim 14, wherein:
said second enclosure means section is connected to remaining portions of said second enclosure.

19. An apparatus, as claimed in claim 10, wherein:
said pressure sensing means is contained within said second enclosure means.

20. An apparatus, as claimed in claim 19, wherein:
said pressure sensing means is spaced from said combustible material in said second enclosure means by a third barrier means.

21. An apparatus, as claimed in claim 20, wherein:
said pressure sensing means includes a diaphragm for creating a first compartment defined by said third barrier means, said diaphragm, and portions of said second enclosure means, wherein said first compartment is in communication with said first enclosure means and is at said second pressure which is substantially equal to said first pressure, and a second compartment defined by said diaphragm and portions of said second enclosure means which contains compressed gas.

22. An apparatus, as claimed in claim 10, wherein:
said ignition means includes at least one of the following: pyrotechnic booster proximate to said combustible material, at least one percussion primer adjacent to said pyrotechnic booster, and a firing pin attached to said pressure sensing means which is substantially aligned with said percussion primer.

23. An apparatus, as claimed in claim 14, wherein:
said ignition means includes at least one of the following: pyrotechnic booster proximate to said combustible material, at least one percussion primer adjacent to said pyrotechnic booster, and a firing pin attached to said diaphragm, wherein said firing pin is substantially aligned with said percussion primer.

24. A method for inflating a container using an apparatus having a first enclosure means containing a compressed gas under a first pressure, a barrier separating said first enclosure means and the container, and a combustible material, comprising:
sensing a condition requiring inflation of the container;
generating an electric signal for breaking said barrier;
permitting compressed gas within said first enclosure means to flow into the container;
sensing whether a pressure differential exists between a second pressure related to said first pressure and a reference pressure, wherein said reference pressure is defined using a gas located in a volume different from a volume used to contain gas defining said second pressure, wherein the gas defining said reference pressure does not substantially contribute to the inflation of the container, and wherein said reference pressure exceeds said second pressure in the dynamic state;
igniting said combustible material by moving an impacting means away from said reference pressure when a first pressure differential is detected; and
mixing exhaust gases from burning said combustible material with said compressed gas in said first enclosure means, wherein the flow rate into the container increases.

25. A method, as claimed in claim 24, wherein:
said barrier is broken using explosive charge means located adjacent to a wall of said first enclosure means.

26. A method, as claimed in claim 24, wherein:
said sensing step includes using means for compensating for temperature.

27. A method, as claimed in claim 24, wherein:
said step of igniting includes using only mechanical moving means for initiating ignition of said combustible material.

28. An apparatus for inflating an inflatable container in which an initial flow rate is provided to the inflatable container and a second, increased flow rate is provided after a time delay, said delay depending upon a pressure differential and the ambient temperature, comprising:
first enclosure means container gas under a first pressure;
first connecting means for attaching said first enclosure means to an inflatable container;
first barrier means between said first enclosure means and said first connecting means;

means for removing said first barrier means, wherein gas from said first enclosure means flows to the inflatable container;

combustible material in said first enclosure means;

pressure sensing means for controlling ignition of said combustible material after a delay; and temperature compensating means for influencing said delay based upon the ambient temperature.

29. An apparatus, as claimed in claim 28, wherein: said temperature compensating means reduces said delay as the ambient temperature is reduced.

30. An apparatus, as claimed in claim 28, wherein: said temperature compensating means increases said delay as the ambient temperature is increased.

31. An apparatus, as claimed in claim 28, wherein: at least portions of said pressure sensing means includes at least portions of said temperature compensating means.

* * * * *